United States Patent
Zhou et al.

(10) Patent No.: US 10,257,827 B2
(45) Date of Patent: Apr. 9, 2019

(54) METHOD FOR CONFIGURING FRAME STRUCTURE, USER EQUIPMENT AND NETWORK EQUIPMENT

(71) Applicant: SPREADTRUM COMMUNICATIONS (SHANGHAI) CO., LTD., Zhangjiang, Shanghai (CN)

(72) Inventors: Huayu Zhou, Shanghai (CN); Hualei Wang, Shanghai (CN); Zhengang Pan, Shanghai (CN); Zhikun Xu, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 65 days.

(21) Appl. No.: 15/453,282

(22) Filed: Mar. 8, 2017

(65) Prior Publication Data
US 2018/0035428 A1    Feb. 1, 2018

(30) Foreign Application Priority Data
Jul. 29, 2016    (CN) .......................... 2016 1 0614724

(51) Int. Cl.
*H04W 72/04*    (2009.01)
*H04L 5/00*    (2006.01)
*H04L 5/16*    (2006.01)

(52) U.S. Cl.
CPC ....... *H04W 72/0446* (2013.01); *H04L 5/0005* (2013.01); *H04L 5/0053* (2013.01); *H04L 5/0064* (2013.01); *H04L 5/0094* (2013.01); *H04W 72/042* (2013.01); *H04L 5/16* (2013.01)

(58) Field of Classification Search
CPC ....... H04L 27/2602; H04L 2025/03796; H04L 5/0048; H04W 48/16; H04W 72/048
See application file for complete search history.

(56) References Cited

U.S. PATENT DOCUMENTS

2017/0201968 A1*  7/2017  Nam ...................... H04W 4/70

FOREIGN PATENT DOCUMENTS

| CN | 101772191 A | 7/2010 |
|---|---|---|
| CN | 103124207 A | 5/2013 |
| WO | 2016113172 A1 | 7/2016 |

OTHER PUBLICATIONS

SIPO First Office Action corresponding to Application No. 201610614724.4; dated Apr. 4, 2018.

* cited by examiner

*Primary Examiner* — Faruk Hamza
*Assistant Examiner* — Aixa A Guadalupe Cruz
(74) *Attorney, Agent, or Firm* — Cantor Colburn LLP (57) ABSTRACT

Method for configuring frame structure, user equipment and network equipment are provided. The method includes: configuring a group of time intervals X and generating configuration information of the group of time intervals X according to a channel condition and communication service demand; adding the configuration information of the group of time intervals X to downlink control information which is carried in a predetermined resource unit; and transmitting the predetermined resource unit to a UE, to indicate the UE to perform data transmission with a network based on the group of time intervals X. In this way, the configuration of the frame structure including the time intervals X is indicated, so that the network and the UE can normally communicate with each other.

20 Claims, 3 Drawing Sheets

METHOD FOR CONFIGURING FRAME STRUCTURE, USER EQUIPMENT AND NETWORK EQUIPMENT

CROSS-REFERENCE TO RELATED APPLICATIONS

The present application claims priority to Chinese patent application No. 201610614724.4, filed on Jul. 29, 2016, and entitled "METHOD FOR CONFIGURING FRAME STRUCTURE, USER EQUIPMENT AND NETWORK EQUIPMENT", and the entire disclosure of which is incorporated herein by reference.

TECHNICAL FIELD

The present disclosure generally relates to communication technology field, and more particularly, to a method for configuring frame structure, user equipment and network equipment.

BACKGROUND $5^{th}$ Generation (5G) mobile communication technology has been a main trend of the development of new generation mobile communication technologies, and is a significant component of the new generation information infrastructure in the future. Compared with 4G, 5G will not only further enhance users' network experience, but will also meet the application demands on all things connected in the future. From the user experience, 5G has a higher speed and wider bandwidth. 5G is expected to increase 10 times faster than 4G, for example, just a few seconds are needed to download a high-definition move, which meets consumer's demands on virtual reality, super High-definition video and other higher network experience needs. From the industry perspective, 5G has higher reliability and lower latency, which meets specific demands of some industry applications, such as smart manufacturing or automatic driving, broadens development space of fusion industry, and supports innovation development of economic society.

Currently, for a frame structure of 5G, a time interval X is defined, which includes a downlink transmission part, a Guard Period (GP), and an uplink transmission part. Further, the time interval X may be classified into three possible types, where the time interval X of type 1 includes a downlink transmission part and a possible GP; the time interval X of type 2 includes a possible GP and an uplink transmission part; the time interval X of type 3 includes a downlink transmission part, one or more GPs and an uplink transmission part. The time interval X of type 3 may be used for downlink to uplink handover in a Time Division Duplexing (TDD) system, as well as for a self-contained structure of UL grant, Hybrid Automatic Repeat Request (HARQ) feedback and fast Channel State Information (CSI) feedback, to obtain low latency.

However, a method for indicating configuration of a frame structure including the time interval X as described above has not been realized at present, so that a network and user equipment can not normally communicate with each other.

SUMMARY

In embodiments of the present disclosure, indication of configuration of a frame structure including the time interval X is realized, so that a network and user equipment can normally communicate with each other.

In an embodiment of the present disclosure, a method for configuring a frame structure is provided, including: configuring a group of time intervals X and generating configuration information of the group of time intervals X according to a channel condition and communication service demand; adding the configuration information of the group of time intervals X to downlink control information which is carried in a predetermined resource unit; and transmitting the predetermined resource unit to a user equipment (UE), to indicate the UE to perform data transmission with a network based on the group of time intervals X.

Optionally, the predetermined resource unit may include one of a downlink control part, a downlink transmission part and a time interval X, where the downlink transmission part includes at least one downlink control part, and the time interval X includes at least one downlink control part.

Optionally, when the predetermined resource unit is the time interval X, a format of the time interval X may be predefined or semi-statically configured.

Optionally, when the predetermined resource unit is the downlink transmission part, a format of the at least one downlink control part in the downlink transmission part may be predefined or semi-statically configured.

Optionally, when the predetermined resource unit is the downlink control part, a format of the downlink control part may be predefined or semi-statically configured.

Optionally, the format of the downlink control part may include a time-frequency position of the downlink control part, and the time-frequency position of the downlink control part may include the number of symbols the downlink control part occupies.

Optionally, the predetermined resource unit may be transmitted to the UE in a statically configured period.

Optionally, the predetermined resource unit may be transmitted to the UE in a semi-statically configured period.

Optionally, the statically configured period or the semi-statically configured period may include N time intervals X, where N is an integer and N>1.

Optionally, the configuration information of the time interval X carried in the predetermined resource unit may indicate configuration of m subsequent time intervals X, where m is an integer and N>m>1.

Optionally, the configuration information of the time interval X carried in the predetermined resource unit may indicate configuration of the time interval X and configuration of n subsequent time intervals X, where n is an integer and N>n>1.

Optionally, any one downlink control part may indicate configuration of a current time interval X.

Optionally, any one downlink control part may indicate configuration of at least one subsequent time interval X of type 2 and an interval corresponding to the subsequent time interval X of type 2, and the UE is scheduled to transmit an uplink data part and/or an uplink control part to the network within the interval corresponding to the subsequent time interval X of type 2.

Optionally, the configuration information of the time interval X may include a type of the time interval X.

Optionally, the configuration information of the time interval X may further include length of a downlink transmission part in the time interval X, length of a guard period in the time interval X and length of an uplink transmission part in the time interval X.

Optionally, when length of the time interval X is fixed, configuring the time interval X may include: when the time interval X belongs to type 1, configuring length of a downlink transmission part in the time interval X or length of a guard period in the time interval X, where the length of the downlink transmission part is adapted to be configured by a terminal symbol index of the downlink transmission part; when the time interval X belongs to type 2, configuring length of an uplink transmission part in the time interval X or the length of the guard period in the time interval X, where the length of the uplink transmission part is adapted to be configured by an initial symbol index of the uplink transmission part; and when the time interval X belongs to type 3, configuring at least two of the length of the downlink transmission part in the time interval X, the length of the guard period in the time interval X and the length of the uplink transmission part in the time interval X, where the length of the downlink transmission part is adapted to be configured by the terminal symbol index of the downlink transmission part, and the length of the uplink transmission part is adapted to be configured by the initial symbol index of the uplink transmission part.

Optionally, when length of the time interval X is variable, configuring the time interval X may include: configuring length of the time interval X; and when the time interval X belongs to type 1, configuring length of a downlink transmission part in the time interval X or length of a guard period in the time interval X, where the length of the downlink transmission part is adapted to be configured by a terminal symbol index of the downlink transmission part, or when the time interval X belongs to type 2, configuring length of an uplink transmission part in the time interval X or the length of the guard period in the time interval X, where the length of the uplink transmission part is adapted to be configured by an initial symbol index of the uplink transmission part.

Optionally, the downlink transmission part may include a downlink data part and a downlink control part, the uplink transmission part may include an uplink data part and an uplink control part, and configuring the time interval X includes indicating the UE length of the downlink control part and/or length of the uplink control part.

Optionally, the length of the downlink control part may be configured statically, semi-statically or through blind detection by the UE, and the length of the uplink control part may be configured statically, semi-statically or dynamically.

Optionally, a candidate subset of length may be indicated in a semi-static way, and an index of the candidate subset may be indicated by a dynamic signaling.

Optionally, when the time interval X belongs to type 3a, the configuration information of the time interval X may include length of the guard period, and the time interval X may include a downlink control part, a downlink data part, the guard period and an uplink control part; and when the time interval X belongs to type 3b, the configuration information of the time interval X may include the length of the guard period, and the time interval X may include a downlink control part, the guard period and an uplink data part.

Optionally, the time interval X belonging to type 3b may further include an uplink control part.

In an embodiment of the present disclosure, a method for configuring a frame structure is provided, including: receiving a resource unit from a network; analyzing the resource unit to obtain configuration information of a group of time intervals X; and performing data transmission with the network based on indication of the configuration information of the group of time intervals X.

In an embodiment of the present disclosure, a network equipment is provided, including: a configuring circuitry configured to configure a group of time intervals X and generate configuration information of the group of time intervals X according to a channel condition and communication service demand; an adding circuitry configured to add the configuration information of the group of time intervals X to downlink control information which is carried in a predetermined resource unit; and a transmitting circuitry configured to transmit the predetermined resource unit to a UE, to indicate the UE to perform data transmission with a network based on the group of time intervals X.

Optionally, the adding circuitry may be configured to make the downlink control information be carried in one of a downlink control part, a downlink transmission part and a time interval X, where the downlink transmission part includes at least one downlink control part, and the time interval X includes at least one downlink control part.

Optionally, the adding circuitry may be configured to: when the predetermined resource unit is the time interval X, predefine or semi-statically configure a format of the time interval X.

Optionally, the adding circuitry may be configured to: when the predetermined resource unit is the downlink transmission part, predefine or semi-statically configure a format of the at least one downlink control part in the downlink transmission part.

Optionally, the adding circuitry may be configured to: when the predetermined resource unit is the downlink control part, predefine or semi-statically configure a format of the downlink control part.

Optionally, the format of the downlink control part may include a time-frequency position of the downlink control part, and the time-frequency position of the downlink control part may include the number of symbols the downlink control part occupies.

Optionally, the transmitting circuitry may be configured to transmit the predetermined resource unit to the UE in a statically configured period.

Optionally, the transmitting circuitry may be configured to transmit the predetermined resource unit to the UE in a semi-statically configured period.

Optionally, the statically configured period or the semi-statically configured period may include N time intervals X, where N is an integer and N>1.

Optionally, the configuration information of the time interval X carried in the predetermined resource unit may indicate configuration of m subsequent time intervals X, where m is an integer and N>m>1.

Optionally, the configuration information of the time interval X carried in the predetermined resource unit may indicate configuration of the time interval X and configuration of n subsequent time intervals X, where n is an integer and N>n>1.

Optionally, any one downlink control part may indicate configuration of a current time interval X.

Optionally, any one downlink control part may indicate configuration of at least one subsequent time interval X of type 2 and an interval corresponding to the subsequent time interval X of type 2, and the UE is scheduled to transmit an uplink data part and/or an uplink control part to the network within the interval corresponding to the subsequent time interval X of type 2.

Optionally, the configuration information of the time interval X may include a type of the time interval X.

Optionally, the configuration information of the time interval X may further include length of a downlink transmission part in the time interval X, length of a guard period in the time interval X and length of an uplink transmission part in the time interval X.

Optionally, the configuring circuitry may be configured to: when length of the time interval X is fixed and the time interval X belongs to type 1, configure length of a downlink transmission part in the time interval X or length of a guard period in the time interval X, where the length of the downlink transmission part is adapted to be configured by a terminal symbol index of the downlink transmission part; when the length of the time interval X is fixed and the time interval X belongs to type 2, configure length of an uplink transmission part in the time interval X or the length of the guard period in the time interval X, where the length of the uplink transmission part is adapted to be configured by an initial symbol index of the uplink transmission part; and when the length of the time interval X is fixed and the time interval X belongs to type 3, configure at least two of the length of the downlink transmission part in the time interval X, the length of the guard period in the time interval X and the length of the uplink transmission part in the time interval X, where the length of the downlink transmission part is adapted to be configured by the terminal symbol index of the downlink transmission part, and the length of the uplink transmission part is adapted to be configured by the initial symbol index of the uplink transmission part.

Optionally, the configuring circuitry may be configured to: when length of the time interval X is variable, configure length of the time interval X; and when the time interval X belongs to type 1, configure length of a downlink transmission part in the time interval X or length of a guard period in the time interval X, or when the time interval X belongs to type 2, configure length of an uplink transmission part in the time interval X or the length of the guard period in the time interval X, where the length of the downlink transmission part is adapted to be configured by a terminal symbol index of the downlink transmission part, and the length of the uplink transmission part is adapted to be configured by an initial symbol index of the uplink transmission part.

Optionally, the configuring circuitry may be configured to: include a downlink data part and a downlink control part in the downlink transmission part, include an uplink data part and an uplink control part in the uplink transmission part, and generate for the UE the configuration information of length of the downlink control part and/or length of the uplink control part.

Optionally, the configuring circuitry may be configured to configure the length of the downlink control part statically or semi-statically, and configure the length of the uplink control part statically, semi-statically or dynamically.

Optionally, the configuring circuitry may be configured to indicate a candidate subset of length in a semi-static way, and indicate an index of the candidate subset by a dynamic signaling.

Optionally, the configuring circuitry may be configured to: when the time interval X belongs to type 3a, generate the configuration information of the time interval X including length of the guard period; and when the time interval X belongs to type 3b, generate the configuration information of the time interval X including the length of the guard period, where the time interval X belonging to type 3a may include a downlink control part, a downlink data part, the guard period and an uplink control part, and the time interval X belonging to type 3b may include a downlink control part, the guard period and an uplink data part.

Optionally, the time interval X belonging to type 3b may further include an uplink control part.

In an embodiment of the present disclosure, a user equipment is provided, including: a receiving circuitry configured to receive a resource unit from a network; an analyzing circuitry configured to analyze the resource unit to obtain configuration information of a group of time intervals X; and a data transmission circuitry configured to perform data transmission with the network based on indication of the configuration information of the group of time intervals X.

Embodiments of the present disclosure may provide following advantages. By generating the configuration information of the time intervals X and adding the configuration information of the time intervals X to the downlink control information which is carried in the predetermined resource unit, the configuration information is transmitted to the UE through the predetermined resource unit, so that the configuration of the frame structure including the time intervals X is indicated, to indicate the UE to perform data transmission with the network based on the time intervals X. In this way, the network and the UE can normally communicate with each other.

Further, the predetermined resource unit is transmitted to the UE in a statically configured period, which may reduce the possibility of the UE not capable of receiving the resource unit and the configuration of the group of time intervals X generated by the network. In this way, robustness of the configuration of the frame structure may be improved.

Further, the predetermined resource unit is transmitted to the UE in a semi-statically configured period, which may also reduce the possibility of the UE not capable of receiving the resource unit and the configuration of the group of time intervals X generated by the network. In this way, robustness of the configuration of the frame structure may be improved.

Further, the configuration of the current time interval X is indicated through any one downlink control part, so that the UE can adjust the configuration of the time interval X according to practical requirements, which may improve flexibility of the configuration of the frame structure.

DETAILED DESCRIPTION 5G mobile communication technology has been a main trend of the development of new generation mobile communication technologies, and is a significant component of the new generation information infrastructure in the future. Compared with 4G, 5G will not only further enhance users' network experience, but will also meet the application demands on all things connected in the future. From the user experience, 5G has a higher speed and wider bandwidth. 5G is expected to increase 10 times faster than 4G, for example, just a few seconds are needed to download a high-definition move, which meets consumer's demands on virtual reality, super High-definition video and other higher network experience needs. From the industry perspective, 5G has higher reliability and lower latency, which meets specific demands of some industry applications, such as smart manufacturing or automatic driving, broadens development space of fusion industry, and supports innovation development of economic society.

Currently, for a frame structure of 5G, 3GPP defines a time interval X, which includes a downlink transmission part, a GP, and an uplink transmission part.

GP has multiple effects on Frequency Division Duplexing (FDD) and TDD communication systems. For example, GP may be used for reserving a processing time for UE, to perform HARQ and timely feedback rapidly. GP may be further used for insertion of emergency messages in Ultra Reliable Low Latency Communication (URLLC). GP may be further used for accommodating signal tailing, such as trailing of a Filter Bank Multi Carrier (FBMC) wave.

For TDD systems, GP may be used for handover from downlink to uplink and providing a time period of Timing Advance (TA) for UE. It should be noted that, for FDD systems, GP is for a particular user which cannot transmit and receive data in the GP, but other users can transmit and receive data within the GP.

Further, the time interval X may be classified into three possible types, where the time interval X of type 1 includes a downlink transmission part and a possible GP; the time interval X of type 2 includes a possible GP and an uplink transmission Part; the time interval X of type 3 comprises a downlink transmission part, one or more GPs and an uplink transmission part. The time interval X of type 3 may be used for downlink to uplink handover in a TDD system, as well as for a self-contained structure of UL grant, HARQ feedback and fast CSI feedback, to obtain low latency.

The configuration of the time interval X, on one hand, relates to the ratio of the uplink transmission part, the downlink transmission part and the GP, such as length of the downlink or uplink transmission part and length of the GP, or length and a position of one or more GP. On the one hand, the configuration of the time interval X relates to various configurations of internal structures of the uplink transmission part and the downlink transmission part themselves.

However, a method for indicating configuration of a frame structure including the time interval X as described above has not been realized at present, so that a network and user equipment can not normally communicate with each other.

In embodiments of the present disclosure, by generating the configuration information of the time intervals X and adding the configuration information of the time intervals X to the downlink control information which is carried in the predetermined resource unit, the configuration information is transmitted to the UE through the predetermined resource unit, so that the configuration of the frame structure including the time intervals X is indicated, to indicate the UE to perform data transmission with the network based on the time intervals X. In this way, the network and the UE can normally communicate with each other.

In embodiments of the present disclosure, static configuration is equal to a predefined mode which is a mode agreed by the network and the UE in advance. Semi-static configuration denotes to a configuration mode through layer 3 control signaling or Radio Resource Control (RRC) signaling, where the RRC signaling may be carried by a Primary Information Block (PIB), a System Information Block (SIB) or other messages. Dynamic configuration denotes to a configuration mode through layer 1 control signaling which may be carried by Downlink Control Information (DCI).

In order to clarify the object, solutions and advantages of embodiments of the present disclosure, embodiments of present disclosure will be described clearly in detail in conjunction with accompanying drawings.

Figure 1:
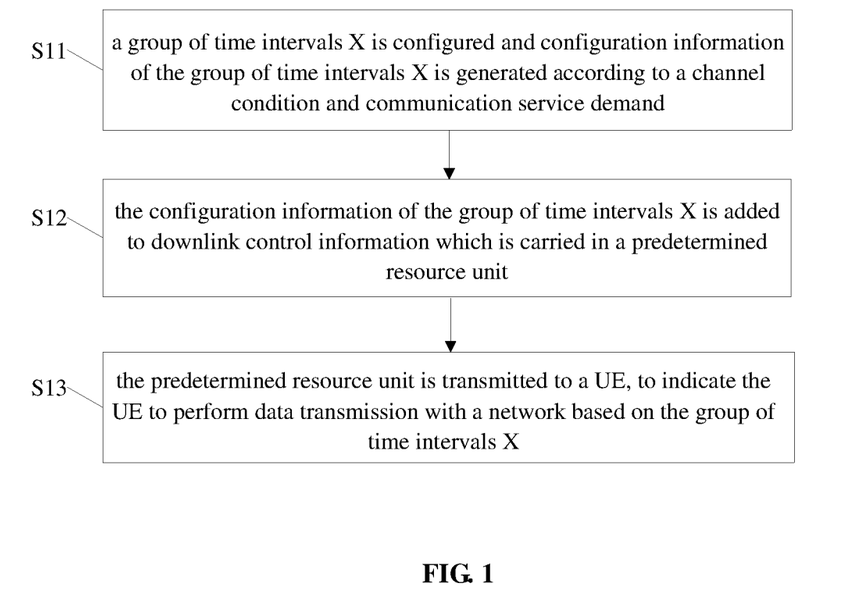
FIG. 1 schematically illustrates a flow chart of a method for configuring a frame structure according to an embodiment.

FIG. 1 schematically illustrates a flow chart of a method for configuring a frame structure according to an embodiment. The method may include S11 to S13.

In S11, a group of time intervals X is configured and configuration information of the group of time intervals X is generated according to a channel condition and communication service demand.

As a network equipment is aware of a current channel quality condition and service demand of a user, the network equipment may configure a group of time intervals X and generate configuration information of the group of time intervals X according to the current channel condition and the communication service demand. The configuration information of the group of time intervals X may be transmitted through specific downlink control information.

As the configuration of the time intervals X relates to many factors, content contained in the configuration information may be various. In some embodiments, the configuration information of the time interval X may include a type of the time interval X.

In some embodiments, besides the type of the time interval X, the configuration information of the time interval X may further include length of a downlink transmission part in the time interval X, length of a GP in the time interval X and length of an uplink transmission part in the time interval X.

As the time intervals X may be classified into multiple types, and each type includes different content, in some embodiments, the network equipment may configure the time intervals X timely and pertinently in different modes according to the channel condition and the communication service demand. In this way, flexibility of configuration may be improved. Besides, signaling overhead may be controlled to be as low as possible during the configuration, which improves robustness.

In some embodiments, length of the time interval X may be fixed. The length of the time interval X may be realized by following ways. First, the length may be predefined, such as 14 symbols or 7 symbols. Second, the length may be semi-statically configured, for example, by assigning 14 symbols or 7 symbols in a PIB or a SIB. Third, the length may be assigned in a resource unit.

In some embodiments, if the length of the time interval X is fixed and the time interval X belongs to type 1, the network equipment may configure length of a downlink transmission part in the time interval X or length of a GP in the time interval X, where the length of the downlink transmission part is adapted to be indicated by a terminal symbol index of the downlink transmission part.

In some embodiments, if the length of the time interval X is fixed and the time interval X belongs to type 2, the network equipment may configure length of an uplink transmission part in the time interval X or the length of the GP in the time interval X, where the length of the uplink transmission part is adapted to be indicated by an initial symbol index of the uplink transmission part.

In some embodiments, if the length of the time interval X is fixed and the time interval X belongs to type 3, as length of a remained part can be deduced implicitly, the network equipment may configure at least two of the length of the downlink transmission part in the time interval X, the length of the GP in the time interval X and the length of the uplink transmission part in the time interval X, where the length of the downlink transmission part is adapted to be configured by the terminal symbol index of the downlink transmission part, and the length of the uplink transmission part is adapted to be configured by the initial symbol index of the uplink transmission part.

For example, when the length of the time interval X is 14 symbols whose indexes are from 0 to 13, if the type of the time interval X is type 1, the network equipment may use 3 bits to indicate 8 possible terminal symbol indexes (6, 7, . . . , 13). If the type of the time interval X is type 2, the network equipment may use 3 bits to indicate 8 possible initial symbol indexes (0, 1, . . . , 7). If the type of the time interval X is type 3, the network equipment may use 2 bits to indicate 4 possible length of the GP (1, 2, 3, 4), and use 2 bits to indicate 4 possible initial symbol indexes (9, 10, 11, 12) of the uplink transmission part.

For another example, when the length of the time interval X is 7 symbols whose indexes are from 0 to 6, if the type of the time interval X is type 1, the network equipment may use 2 bits to indicate 4 possible terminal symbol indexes (3, 4, 5, 6). If the type of the time interval X is type 2, the network equipment may use 2 bits to indicate 4 possible initial symbol indexes (0, 1, 2, 3). If the type of the time interval X is type 3, the network equipment may use 2 bits to indicate 4 possible length of the GP (1, 2, 3, 4), and use 1 bits to indicate 2 possible initial symbol indexes (5, 6) of the uplink transmission part.

To reduce signaling overhead, in some embodiments, the time intervals X belonging to type 3 may be classified into a downlink dominant subclass and an uplink dominant subclass. When the network equipment configures at least two of the length of the downlink transmission part in the time interval X, the length of the GP in the time interval X and the length of the uplink transmission part in the time interval X, candidate sets of length to be indicated may be reduced.

To further reduce signaling overhead, in some embodiments, a candidate subset of length of each part may be indicated in a semi-static way, and an index of the candidate subset may be indicated by a dynamic signaling. Classifying the time intervals X belonging to type 3 into a downlink dominant subclass and an uplink dominant subclass is one embodiments of this manner.

In some embodiments, to reduce signaling overhead, instead of using a time interval X of type 3, a time interval X of type 1 and a time interval X of type 2 in sequence are used to constitute a time interval X of type 3.

For example, when the length of the time interval X is 7 symbols whose indexes are from 0 to 6, if the type of the time interval X is type 1, the network equipment may use 2 bits to indicate 4 possible terminal symbol indexes (3, 4, 5, 6). If the type of the time interval X is type 2, the network equipment may use 2 bits to indicate 4 possible initial symbol indexes (0, 1, 2, 3). In this case, the time interval X of type 1 and the time interval X of type 2 in sequence constitute a time interval X of type 3 with length of 14 symbols. Whether the type 3 is supported may be predefined or semi-statically indicated by the network.

Optionally, the length of the time interval X may be variable. If the length of the time interval X is variable, the network equipment may configure the length of the time intervals X first, and further configure the time intervals X according to types.

In some embodiments, when the time interval X belongs to type 1, the network equipment may configure length of a downlink transmission part in the time interval X or length of a GP in the time interval X, where the length of the downlink transmission part is adapted to be configured by a terminal symbol index of the downlink transmission part. When the time interval X belongs to type 2, the network equipment may configure length of an uplink transmission part in the time interval X or the length of the GP in the time interval X, where the length of the uplink transmission part is adapted to be configured by an initial symbol index of the uplink transmission part. Those skilled in the art can understand that, as the length of the time interval X is variable, by adjusting the configurations of the time interval X of type 1 and the time interval X of type 2, configuration of a time interval X of type 3 may be obtained. Therefore, the configuration of the time interval X of type 3 is not described in detail here.

In some embodiments, the downlink transmission part may include a downlink data part and a downlink control part, and the uplink transmission part may include an uplink data part and an uplink control part. To indicate a position and length of the downlink control part, and a position and length of the uplink control part, extra signaling is needed.

In some embodiments, if the downlink transmission part includes a downlink control part, the downlink control part is fixed before the downlink data part; and if the uplink transmission part includes an uplink control part, the uplink control part is fixed after the uplink data part. Therefore, it is possible to only indicate the length of the downlink control part and the length of the uplink control part.

The length of the downlink control part may be configured statically or semi-statically, or obtained through blind detection by the UE. In some embodiments, a maximum value may be set statically or semi-statically for the length of the downlink control part, such as 2 symbols. The UE may obtain practical length of the downlink control part by blind detection, such as blindly detecting the downlink control information or Control Format Indication (CFI). In this case, the length of the downlink control part does not need to be indicated by a dynamic signaling.

The length of the uplink control part may be configured statically, semi-statically or dynamically.

To further reduce signaling overhead, in some embodiments, the time interval X of type 3 may be defined to consist of two typical subclasses, including downlink dominant class and uplink dominant class. The downlink dominant time interval X of type 3 is called a time interval X of type 3a, and the uplink dominant time interval X of type 3 is called a time interval X of type 3b. The time interval X of type 3a may include a downlink control part, a downlink data part, the GP and an uplink control part, and the time interval X of type 3b may include a downlink control part, the GP and an uplink data part. In some embodiments, besides the downlink control part, the GP and the uplink data part, the time interval X of type 3b may further include an uplink control part. That is to say, the time interval X of type 3b may include or not include an uplink control part.

As described above, the length of the downlink control part and the uplink control part may be configured statically, semi-statically or by blind detection. Therefore, to the time intervals X of type 3a or 3b, the network may only need to indicate the length of GP.

For example, the length of the uplink control part and the downlink control part is statically or semi-statically indicated to be 1 symbol and 2 symbols respectively, and the length of the time interval X is 14 symbols or 7 symbols and symbol indexes are from 0 to 13 or from 0 to 6. When the time interval X belongs to type 3a or 3b, the network equipment may use two bits to indicate four possible GP length (1, 2, 3, 4).

Further, in some embodiments, the length of CP is a parameter in cell configuration. For example, when the GP is used for downlink to uplink handover in a TDD system, the CP needs to satisfy TA of UE at different positions. As TA is related to radius of a cell, the length of CP becomes a parameter in the cell configuration. In this case, the CP is a predetermined value of the system, thus, there is no need to indicate the UE through a signaling.

S12, the configuration information of the group of time intervals X is added to downlink control information which is carried in a predetermined resource unit.

In some embodiments, the downlink control information may include a plurality of groups of information. The configuration information of the group of time intervals X is added to the downlink control information which is carried in the predetermined resource unit to be transmitted.

In some embodiments, the predetermined resource unit may have various forms. For example, it may be a downlink control part, a downlink transmission part or a time interval X, where the downlink transmission part includes at least one downlink control part, and the time interval X includes at least one downlink control part.

In some embodiments, when the predetermined resource unit is the time interval X, a format of the time interval X may be predefined or semi-statically configured.

In some embodiments, when the predetermined resource unit is the downlink transmission part, a format of the at least one downlink control part in the downlink transmission part may be predefined or semi-statically configured.

In some embodiments, when the predetermined resource unit is the downlink control part, a format of the downlink control part may be predefined or semi-statically configured.

In some embodiments, the format of the downlink control part may include a time-frequency position of the downlink control part, and the time-frequency position of the downlink control part may include the number of symbols the downlink control part occupies. In some embodiments, the downlink control part may include data schedule designation information, uplink data HARQ feedback information, and common control information. The common control information may include system information, paging information, Random Access Response (RAR) information and etc.

In S13, the predetermined resource unit is transmitted to a UE, to indicate the UE to perform data transmission with a network based on the group of time intervals X.

In some embodiments, the network equipment may transmit the predetermined resource unit to the UE through various ways. In some embodiments, the network equipment may transmit the predetermined resource unit to the UE in a statically configured period, that is, the network equipment and the UE transmit and receive the predetermined resource unit according to a predefined period.

In some embodiments, the network equipment may transmit the predetermined resource unit to the UE in a semi-statically configured period, that is, the network equipment informs the UE to use a particular period through layer 3 control signaling or RRC signaling, and the network equipment and the UE transmit and receive data according to the particular period, where the RRC signaling may be carried by a PIB, a SIB or other messages. In this way, robustness of the configuration of the frame structure may be improved.

Figure 2:
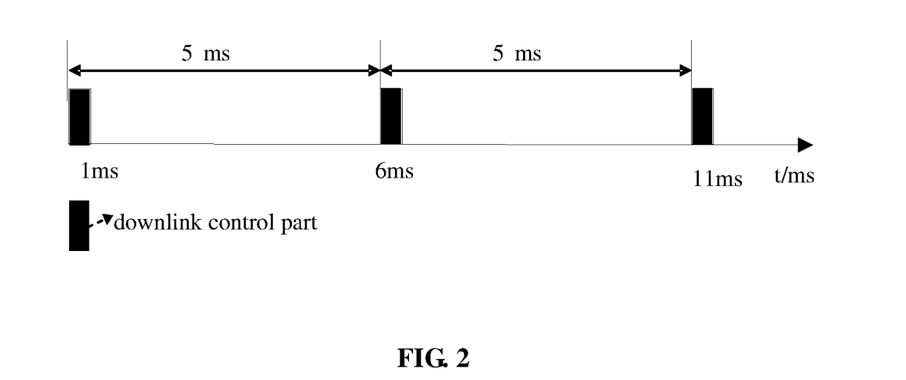
FIG. 2 schematically illustrates a diagram of a process of transmitting a resource unit to a UE according to an embodiment.
Figure 3:
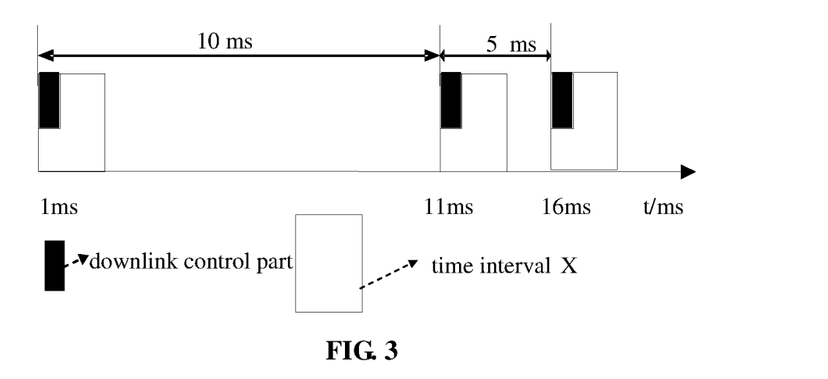
FIG. 3 schematically illustrates a diagram of a process of transmitting a resource unit to a UE according to an embodiment.

The statically configured period or the semi-statically configured period may have fixed length or unfixed length. FIG. 2 schematically illustrates a diagram of a process of transmitting a resource unit to a UE according to an embodiment. Referring to FIG. 2, within 20 ms, the network equipment may transmit the predetermined resource unit in a fixed period of 5 ms, that is, transmit the predetermined resource unit at 1 ms, 6 ms and 11 ms, where the predetermined resource unit is the downlink control part. In another embodiment, the predetermined resource unit is a time interval X which includes a downlink control part. FIG. 3 schematically illustrates a diagram of a process of transmitting a resource unit to a UE according to the embodiment. Referring to FIG. 3, within 20 ms, the network equipment may transmit the predetermined resource unit at 1 ms, 11 ms and 16 ms, where the period has unfixed length.

To reduce consumption of communication resources, in some embodiments, the period may include N time intervals X, where N is an integer and N>1. In some embodiments, N is greater than 5 or 10. Those skilled in the art can adjust a value of N according to practical requirements, and a protection scope of the present disclosure is not limited by the value of N.

In some embodiments, the configuration information of the time interval X carried in the predetermined resource unit may indicate configuration of m subsequent time intervals X, where m is an integer and N>m>1.

Figure 4:
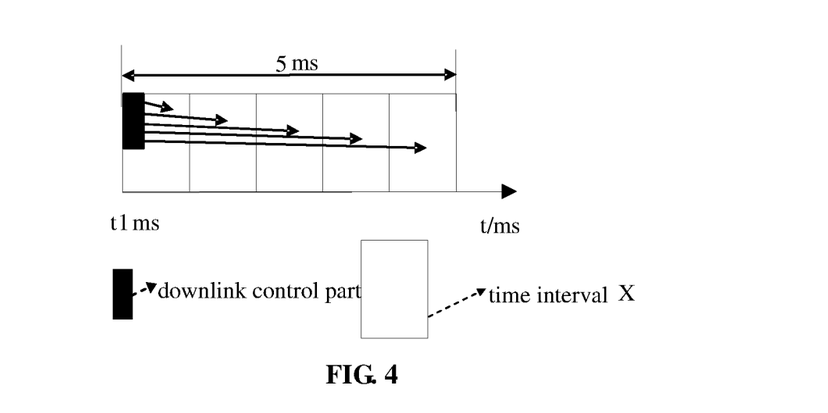
FIG. 4 schematically illustrates a flow chart of a method for indicating configuration of time intervals X for a UE according to an embodiment.

In some embodiments, the configuration information of the time interval X carried in the predetermined resource unit may indicate configuration of the time interval X and configuration of n subsequent time intervals X, where n is an integer and N>n>1. FIG. 4 schematically illustrates a flow chart of a method for indicating configuration of time intervals X for a UE according to an embodiment. Referring to FIG. 4, when the predetermined resource unit is the time interval X including a downlink control part, and the time interval X is 1 ms, n=4, and the period has fixed length of 5 ms, the time interval X transmitted at a time point t1 may indicate configuration of the current time interval X and four subsequent time intervals X.

To improve flexibility of the configuration of the frame structure, in some embodiments, any one downlink control part may indicate configuration of a current time interval X, and may further indicate configuration of at least one subsequent time interval X of type 2 and an interval corresponding to the subsequent time interval X of type 2. Besides, the UE is scheduled to transmit an uplink data part and/or an uplink control part to the network within the interval corresponding to the subsequent time interval X of type 2.

Figure 5:
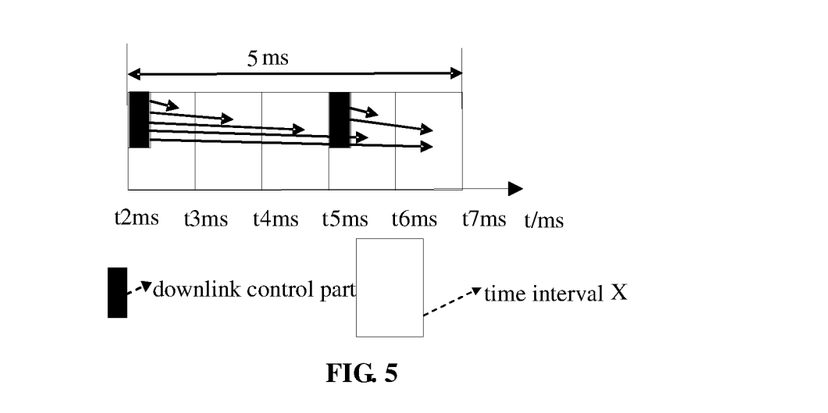
FIG. 5 schematically illustrates a flow chart of a method for indicating configuration of time intervals X for a UE according to an embodiment.

FIG. 5 schematically illustrates a flow chart of a method for indicating configuration of time intervals X for a UE according to an embodiment. Referring to FIG. 5, when the predetermined resource unit is the time interval X including a downlink control part, and the period has fixed length of 5 ms, the time interval X transmitted at a time point t2 may indicate configuration of the time interval X from t2 to t7. However, as the channel quality or service demand may change subsequently, the time interval X including a downlink control part may be re-transmitted at a subsequent time point, for example, t5, to indicate configuration of the time interval X from t5 to t7.

From above, in embodiments of the present disclosure, by generating the configuration information of the time intervals X and adding the configuration information of the time intervals X to the downlink control information which is carried in the predetermined resource unit, the configuration information is transmitted to the UE through the predetermined resource unit, so that the configuration of the frame structure including the time intervals X is indicated, to indicate the UE to perform data transmission with the network based on the time intervals X. In this way, the network and the UE can normally communicate with each other.

Figure 6:
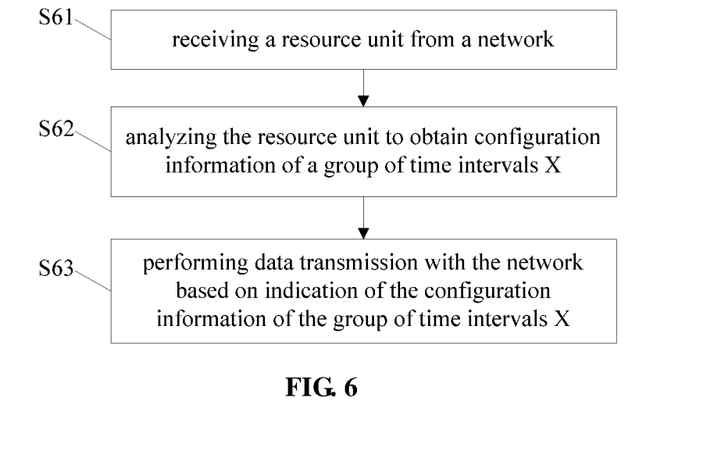
FIG. 6 schematically illustrates a flow chart of a method for configuring a frame structure according to an embodiment.

To make those skilled in the art better understand and realize the present disclosure, FIG. 6 schematically illustrates a flow chart of a method for configuring a frame structure according to another embodiment. Referring to FIG. 6, the method may include:

S61, receiving a resource unit from a network;

S62, analyzing the resource unit to obtain configuration information of a group of time intervals X; and S63, performing data transmission with the network based on indication of the configuration information of the group of time intervals X.

As the resource unit is a carrier of the configuration information, the UE may analyze the resource unit to obtain the configuration information of the group of time intervals X.

In some embodiments, the UE may perform data transmission with the network based on the indication of the configuration information of the group of time intervals X. For example, the UE may adjust a mode of data transmission with the network according to a type of the time interval X.

Figure 7:
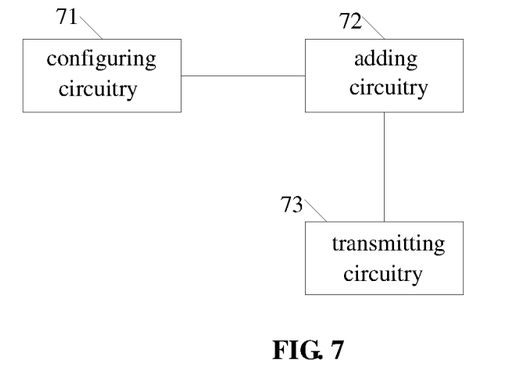
FIG. 7 schematically illustrates a structural diagram of a network equipment according to an embodiment.

To make those skilled in the art better understand and realize the present disclosure, FIG. 7 schematically illustrates a structural diagram of a network equipment according to an embodiment. Referring to FIG. 7, the network equipment includes a configuring circuitry 71, an adding circuitry 72 and a transmitting circuitry 73.

The configuring circuitry 71 may be configured to configure a group of time intervals X and generate configuration information of the group of time intervals X according to a channel condition and communication service demand; the adding circuitry 72 may be configured to add the configuration information of the group of time intervals X to downlink control information which is carried in a predetermined resource unit; and the transmitting circuitry 73 may be configured to transmit the predetermined resource unit to a UE, to indicate the UE to perform data transmission with a network based on the group of time intervals X.

From above, by the configuring circuitry generating the configuration information of the time intervals X and the adding circuitry adding the configuration information of the time intervals X to the downlink control information which is carried in the predetermined resource unit, the transmitting circuitry 73 transmits the configuration information to the UE through the predetermined resource unit, so that the configuration of the frame structure including the time intervals X is indicated, to indicate the UE to perform data transmission with the network based on the time intervals X. In this way, the network and the UE can normally communicate with each other.

In some embodiments, the adding circuitry 72 may be configured to make the downlink control information be carried in one of a downlink control part, a downlink transmission part and a time interval X, where the downlink transmission part includes at least one downlink control part, and the time interval X includes at least one downlink control part.

In some embodiments, the adding circuitry 72 may be configured to: when the predetermined resource unit is the time interval X, predefine or semi-statically configure a format of the time interval X.

In some embodiments, the adding circuitry 72 may be configured to: when the predetermined resource unit is the downlink transmission part, predefine or semi-statically configure a format of the at least one downlink control part in the downlink transmission part.

In some embodiments, the adding circuitry 72 may be configured to: when the predetermined resource unit is the downlink control part, predefine or semi-statically configure a format of the downlink control part.

In some embodiments, the format of the downlink control part may include a time-frequency position of the downlink control part, and the time-frequency position of the downlink control part may include the number of symbols the downlink control part occupies.

To improve robustness of the configuration of the frame structure, in some embodiments, the transmitting circuitry 73 may be configured to transmit the predetermined resource unit to the UE in a statically configured period.

In some embodiments, the transmitting circuitry 73 may be configured to transmit the predetermined resource unit to the UE in a semi-statically configured period.

In some embodiments, the statically configured period or the semi-statically configured period may include N time intervals X, where N is an integer and N>1.

In some embodiments, the configuration information of the time interval X carried in the predetermined resource unit may indicate configuration of m subsequent time intervals X, where m is an integer and N>m>1.

In some embodiments, the configuration information of the time interval X carried in the predetermined resource unit may indicate configuration of the time interval X and configuration of n subsequent time intervals X, where n is an integer and N>n>1.

To improve flexibility of the configuration of the frame structure, in some embodiments, any one downlink control part may indicate configuration of a current time interval X.

In some embodiments, any one downlink control part may indicate configuration of at least one subsequent time interval X of type 2 and an interval corresponding to the subsequent time interval X of type 2, and the UE is scheduled to transmit an uplink data part and/or an uplink control part to the network within the interval corresponding to the subsequent time interval X of type 2.

In some embodiments, the configuration information of the time interval X may include a type of the time interval X.

In some embodiments, the configuration information of the time interval X may further include length of a downlink transmission part in the time interval X, length of a GP in the time interval X and length of an uplink transmission part in the time interval X.

In some embodiments, the configuring circuitry 71 may be configured to: when length of the time interval X is fixed and the time interval X belongs to type 1, configure length of a downlink transmission part in the time interval X or length of a GP in the time interval X, where the length of the downlink transmission part is adapted to be configured by a terminal symbol index of the downlink transmission part.

In some embodiments, the configuring circuitry 71 may be configured to: when the length of the time interval X is fixed and the time interval X belongs to type 2, configure length of an uplink transmission part in the time interval X or the length of the GP in the time interval X, where the length of the uplink transmission part is adapted to be configured by an initial symbol index of the uplink transmission part.

In some embodiments, the configuring circuitry 71 may be configured to: when the length of the time interval X is fixed and the time interval X belongs to type 3, configure at least two of the length of the downlink transmission part in the time interval X, the length of the GP in the time interval X and the length of the uplink transmission part in the time interval X, where the length of the downlink transmission part is adapted to be configured by the terminal symbol index of the downlink transmission part, and the length of the uplink transmission part is adapted to be configured by the initial symbol index of the uplink transmission part.

In some embodiments, the configuring circuitry 71 may be configured to: when length of the time interval X is variable, configure length of the time interval X; and when the time interval X belongs to type 1, configure length of a downlink transmission part in the time interval X or length of a GP in the time interval X.

In some embodiments, the configuring circuitry 71 may be configured to: when the time interval X belongs to type 2, configure length of an uplink transmission part in the time interval X or the length of the GP in the time interval X, where the length of the downlink transmission part is adapted to be configured by a terminal symbol index of the downlink transmission part, and the length of the uplink transmission part is adapted to be configured by an initial symbol index of the uplink transmission part.

In some embodiments, the configuring circuitry 71 may be configured to: include a downlink data part and a downlink control part in the downlink transmission part, include an uplink data part and an uplink control part in the uplink transmission part, and generate for the UE the configuration information of length of the downlink control part and/or length of the uplink control part.

In some embodiments, the configuring circuitry 71 may be configured to configure the length of the downlink control part statically or semi-statically, and configure the length of the uplink control part statically, semi-statically or dynamically.

In some embodiments, the configuring circuitry 71 may be configured to indicate a candidate subset of length in a semi-static way, and indicate an index of the candidate subset by a dynamic signaling.

In some embodiments, the configuring circuitry 71 may be configured to: when the time interval X belongs to type 3a, generate the configuration information of the time interval X including length of the GP, where the time interval X belonging to type 3a may include a downlink control part, a downlink data part, the GP and an uplink control part.

In some embodiments, the configuring circuitry 71 may be configured to: when the time interval X belongs to type 3b, generate the configuration information of the time interval X including the length of the GP, where the time interval X belonging to type 3b may include a downlink control part, the GP and an uplink data part.

In some embodiments, the time interval X belonging to type 3b may further include an uplink control part.

Figure 8:
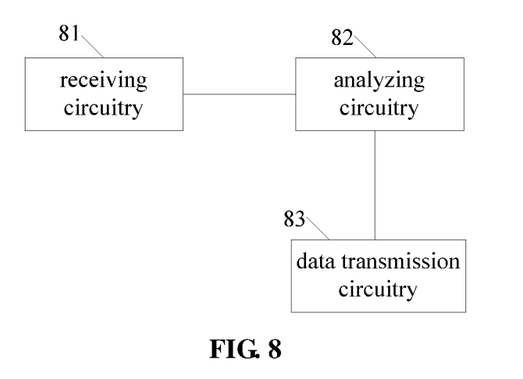
FIG. 8 schematically illustrates a structural diagram of a user equipment according to an embodiment.

To make those skilled in the art better understand and realize the present disclosure, FIG. 8 schematically illustrates a structural diagram of a user equipment according to an embodiment. Referring to FIG. 8, the user equipment includes a receiving circuitry 81, an analyzing circuitry 82 and a data transmission circuitry 83.

The receiving circuitry 81 may be configured to receive a resource unit from a network; the analyzing circuitry 82 may be configured to analyze the resource unit to obtain configuration information of a group of time intervals X; and the data transmission circuitry 83 may be configured to perform data transmission with the network based on indication of the configuration information of the group of time intervals X.

Those skilled in the art can understand that all of or a portion of the processes in the method provided in the above embodiments can be implemented by related hardware with instruction of computer program. The computer program may be stored in a readable storage medium, such as a magnetic disk, an optical disk, a Read-Only Memory (ROM) or a Random Access Memory (RAM).

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for configuring a frame structure, comprising:
   configuring a group of time intervals X and generating configuration information of the group of time intervals X according to a channel condition and communication service demand;
   adding the configuration information of the group of time intervals X to downlink control information which is carried in a predetermined resource unit; and
   transmitting the predetermined resource unit to a user equipment (UE), to indicate the UE to perform data transmission with a network based on the group of time intervals X,
   wherein the predetermined resource unit comprises one of a downlink control part, a downlink transmission part and a time interval X, where the downlink transmission part comprises at least one downlink control part, and the time interval X comprises at least one downlink control part,
   wherein when length of the time interval X is fixed, configuring the time interval X comprises:
      when the time interval X belongs to type 1, configuring length of a downlink transmission part in the time interval X or length of a guard period in the time interval X, where the length of the downlink transmission part is adapted to be configured by a terminal symbol index of the downlink transmission part;
      when the time interval X belongs to type 2, configuring length of an uplink transmission part in the time interval X or the length of the guard period in the time interval X, where the length of the uplink transmission part is adapted to be configured by an initial symbol index of the uplink transmission part; and
      when the time interval X belongs to type 3, configuring at least two of the length of the downlink transmission part in the time interval X, the length of the guard period in the time interval X and the length of the uplink transmission part in the time interval X, where the length of the downlink transmission part is adapted to be configured by the terminal symbol index of the downlink transmission part, and the length of the uplink transmission part is adapted to be configured by the initial symbol index of the uplink transmission part.

2. The method according to claim 1, wherein a candidate subset of the length is indicated in a semi-static way, and an index of the candidate subset is indicated by a dynamic signaling.

3. A method for configuring a frame structure, comprising:

configuring a group of time intervals X and generating configuration information of the group of time intervals X according to a channel condition and communication service demand;

adding the configuration information of the group of time intervals X to downlink control information which is carried in a predetermined resource unit; and transmitting the predetermined resource unit to a user equipment (UE), to indicate the UE to perform data transmission with a network based on the group of time intervals X, wherein the predetermined resource unit comprises one of a downlink control part, a downlink transmission part and a time interval X, where the downlink transmission part comprises at least one downlink control part, and the time interval X comprises at least one downlink control part, wherein when length of the time interval X is variable, configuring the time interval X comprises:

configuring length of the time interval X; and when the time interval X belongs to type 1, configuring length of a downlink transmission part in the time interval X or length of a guard period in the time interval X, where the length of the downlink transmission part is adapted to be configured by a terminal symbol index of the downlink transmission part, or when the time interval X belongs to type 2, configuring length of an uplink transmission part in the time interval X or the length of the guard period in the time interval X, where the length of the uplink transmission part is adapted to be configured by an initial symbol index of the uplink transmission part.

4. The method according to claim 3, wherein when the predetermined resource unit is the time interval X, a format of the time interval X is predefined or semi-statically configured.

5. The method according to claim 3, wherein when the predetermined resource unit is the downlink transmission part, a format of the at least one downlink control part in the downlink transmission part is predefined or semi-statically configured.

6. The method according to claim 3, wherein when the predetermined resource unit is the downlink control part, a format of the downlink control part is predefined or semi-statically configured.

7. The method according to claim 6, wherein the format of the downlink control part comprises a time-frequency position of the downlink control part, and the time-frequency position of the downlink control part comprises the number of symbols the downlink control part occupies.

8. The method according to claim 3, wherein the predetermined resource unit is transmitted to the UE in a statically configured period.

9. The method according to claim 3, wherein the predetermined resource unit is transmitted to the UE in a semi-statically configured period.

10. The method according to claim 3, wherein the configuration information of the time interval X carried in the predetermined resource unit indicates configuration of m subsequent time intervals X, where m is an integer and N>m>1.

11. The method according to claim 3, wherein the configuration information of the time interval X carried in the predetermined resource unit indicates configuration of the time interval X and configuration of n subsequent time intervals X, where n is an integer and N>n>1.

12. The method according to claim 3, wherein any one downlink control part indicates configuration of a current time interval X.

13. The method according to claim 3, wherein any one downlink control part indicates configuration of at least one subsequent time interval X of type 2 and an interval corresponding to the subsequent time interval X of type 2, and the UE is scheduled to transmit an uplink data part and/or an uplink control part to the network within the interval corresponding to the subsequent time interval X of type 2.

14. The method according to claim 3, wherein the configuration information of the time interval X comprises a type of the time interval X.

15. The method according to claim 14, wherein the configuration information of the time interval X further comprises length of a downlink transmission part in the time interval X, length of a guard period in the time interval X and length of an uplink transmission part in the time interval X.

16. The method according to claim 15, wherein when the time interval X belongs to type 3a, the configuration information of the time interval X comprises length of the guard period, and the time interval X comprises a downlink control part, a downlink data part, the guard period and an uplink control part; and when the time interval X belongs to type 3b, the configuration information of the time interval X comprises the length of the guard period, and the time interval X comprises a downlink control part, the guard period and an uplink data part.

17. The method according to claim 16, wherein the time interval X belonging to type 3b further comprises an uplink control part.

18. The method according to claim 3, wherein a candidate subset of the length is indicated in a semi-static way, and an index of the candidate subset is indicated by a dynamic signaling.

19. A method for configuring a frame structure, comprising:

receiving a resource unit from a network;

analyzing the resource unit to obtain configuration information of a group of time intervals X; and performing data transmission with the network based on indication of the configuration information of the group of time intervals X, wherein the resource unit comprises one of a downlink control part, a downlink transmission part and a time interval X, where the downlink transmission part comprises at least one downlink control part, and the time interval X comprises at least one downlink control part, wherein the configuration information of the time interval X comprises length of the time interval X, wherein when the time interval X belongs to type 1, the configuration information of the time interval X further comprises length of a downlink transmission part in the time interval X or length of a guard period in the time interval X, where the length of the downlink transmission part is adapted to be configured by a terminal symbol index of the downlink transmission part;

wherein when the time interval X belongs to type 2, the configuration information of the time interval X further comprises length of an uplink transmission part in the time interval X or the length of the guard period in the time interval X, where the length of the uplink transmission part is adapted to be configured by an initial symbol index of the uplink transmission part; and wherein when the time interval X belongs to type 3, the configuration information of the time interval X further comprises at least two of the length of the downlink transmission part in the time interval X, the length of the guard period in the time interval X and the length of the uplink transmission part in the time interval X, where the length of the downlink transmission part is adapted to be configured by the terminal symbol index of the downlink transmission part, and the length of the uplink transmission part is adapted to be configured by the initial symbol index of the uplink transmission part.

20. A method for configuring a frame structure, comprising:

receiving a resource unit from a network;

analyzing the resource unit to obtain configuration information of a group of time intervals X; and performing data transmission with the network based on indication of the configuration information of the group of time intervals X, wherein the resource unit comprises one of a downlink control part, a downlink transmission part and a time interval X, where the downlink transmission part comprises at least one downlink control part, and the time interval X comprises at least one downlink control part, wherein the configuration information of the time interval X comprises length of the time interval X, wherein when the time interval X belongs to type 1, the configuration information of the time interval X further comprises length of a downlink transmission part in the time interval X or length of a guard period in the time interval X, where the length of the downlink transmission part is adapted to be configured by a terminal symbol index of the downlink transmission part, and wherein when the time interval X belongs to type 2, the configuration information of the time interval X further comprises length of an uplink transmission part in the time interval X or the length of the guard period in the time interval X, where the length of the uplink transmission part is adapted to be configured by an initial symbol index of the uplink transmission part.

* * * * *